(12) United States Patent
Nguyen et al.

(10) Patent No.: US 7,131,114 B2
(45) Date of Patent: Oct. 31, 2006

(54) DEBUGGER BREAKPOINT MANAGEMENT IN A MULTICORE DSP DEVICE HAVING SHARED PROGRAM MEMORY

(75) Inventors: Tai H. Nguyen, Houston, TX (US); Jay B. Reimer, Houston, TX (US); H. Glenn Hopkins, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 691 days.

(21) Appl. No.: 10/195,640

(22) Filed: Jul. 15, 2002

(65) Prior Publication Data

US 2003/0014736 A1    Jan. 16, 2003

Related U.S. Application Data

(60) Provisional application No. 60/305,767, filed on Jul. 16, 2001.

(51) Int. Cl.
*G06F 9/44* (2006.01)
*G06F 13/24* (2006.01)

(52) U.S. Cl. .................. 717/129; 717/124; 710/261
(58) Field of Classification Search ............... 717/129, 717/124; 711/148; 710/261
See application file for complete search history.

(56) References Cited

U.S. PATENT DOCUMENTS

| | | | | |
|---|---|---|---|---|
| 5,093,914 A | * | 3/1992 | Coplien et al. | 717/129 |
| 5,889,988 A | * | 3/1999 | Held | 718/103 |
| 6,021,167 A | * | 2/2000 | Wu | 375/354 |
| 6,058,458 A | * | 5/2000 | Lee | 711/148 |
| 6,077,312 A | * | 6/2000 | Bates et al. | 717/129 |
| 6,081,783 A | * | 6/2000 | Divine et al. | 705/500 |
| 6,101,598 A | * | 8/2000 | Dokic et al. | 712/227 |
| 6,385,704 B1 | * | 5/2002 | Rao et al. | 711/151 |

(Continued)

OTHER PUBLICATIONS

Texas Instruments, "Code Composer Studio User's Guide", Feb. 2000 (37 pages extracted). Online version can be obtained at <focus.ti.com/general/docs/lit/>.*

(Continued)

*Primary Examiner*—Tuan Dam
*Assistant Examiner*—Thuy Dao
(74) *Attorney, Agent, or Firm*—Robert D. Marshall, Jr.; W. James Brady; Frederick J. Telecky, Jr.

(57) ABSTRACT

A processing system comprises a digital signal processor (DSP) device and a host system on which the DSP device is implemented. The DSP device comprises a shared program memory and a plurality of processor subsystems coupled to the shared program memory to concurrently execute program instructions stored in the shared program memory. The host system is capable of independently debugging each subsystem. During debugging, the host device inserts breakpoints into the shared program memory and tracks the debug breakpoints to determine which subsystems are associated with the breakpoints. When a subsystem executes a breakpoint associated with that subsystem, the subsystem halts until the host gathers necessary debug information from the subsystem. However, when a subsystem executes a breakpoint that is not associated with that subsystem, the host system causes the subsystem to execute the original program instructions and proceed as directed.

6 Claims, 3 Drawing Sheets

U.S. PATENT DOCUMENTS

| | | | |
|---|---|---|---|
| 6,553,513 B1 * | 4/2003 | Swoboda et al. | 714/28 |
| 6,681,280 B1 * | 1/2004 | Miyake et al. | 710/261 |
| 6,691,216 B1 * | 2/2004 | Kelly et al. | 711/167 |
| 6,708,326 B1 * | 3/2004 | Bhattacarya | 717/124 |
| 6,892,266 B1 * | 5/2005 | Reimer et al. | 710/305 |
| 6,895,479 B1 * | 5/2005 | Reimer et al. | 711/152 |
| 6,920,572 B1 * | 7/2005 | Nguyen et al. | 713/322 |
| 6,925,634 B1 * | 8/2005 | Hunter et al. | 717/124 |
| 6,990,657 B1 * | 1/2006 | Hunter et al. | 717/129 |
| 7,006,521 B1 * | 2/2006 | Nguyen et al. | 370/462 |
| 7,007,267 B1 * | 2/2006 | Hunter et al. | 717/124 |
| 7,039,901 B1 * | 5/2006 | Hunter et al. | 717/124 |

OTHER PUBLICATIONS

Texas Instruments, "Code Composer Studio User's Guide", Feb. 2000, Chapters 1 and 2, pp. 1-1 to 2-25 (30 pages extracted). [Online] [Retrieved at] <focus.ti.com/general/docs/lit/>.*

W. Wong, "Microprocessor Debugging: It's Not Just Threads Anymore", Jul. 9, 2001, 4 pages. [Online] [Retrieved at] <http://www.elecdesign.com>.*

Texas Instruments, Inc., "Code Composer Studio White Paper", SPRA520, May 1999, 24 pages. [Online] [Retrieved at] <http://www.ti.com>.*

* cited by examiner ns. ## DEBUGGER BREAKPOINT MANAGEMENT IN A MULTICORE DSP DEVICE HAVING SHARED PROGRAM MEMORY This application claims priority under 35 USC §119(e)(1) of Provisional Application No. 60/305,767, filed Jul. 16, 2001.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to digital signal processors. More particularly, the invention relates to a program memory that is shared by multiple processor cores. Still more particularly, the present invention relates to the debugging of software loaded into the shared program memory using breakpoints that may be intended for one or more cores in the digital signal processor.

2. Background of the Invention

Microprocessors generally include a variety of logic circuits fabricated on a single semiconductor chip. Such logic circuits typically include a processor core, memory, and numerous other support components. Some microprocessors, such as digital signal processors (DSPs), may include multiple processor subsystems each having its own processor core, memory and other support components.

It is generally desirable for processors such as DSPs to be compact, consume very little power, and generate as little heat as possible. This is especially true for processors that reside in small, battery-powered devices such as cellular telephones, pagers, and the like. One method for reducing the size and power consumption of processors is to remove some of the redundancy of multi-core processors by allowing some support components to be shared by multiple cores.

One component that can be shared is program memory. A shared program memory provides a compact, low power alternative to conventional multi-core processors by eliminating some of the redundancy of on-board memory. With a shared program memory, some or all application program instructions are accessible and executable by some or all cores in the multi-core processor. Since each of the processor's cores may execute the same software program, memory requirements may be reduced by having the processor cores share only a single copy of the software.

It is typically necessary to debug software that is executed by a processor to ensure the software is error free and compatible with associated hardware. Software debugging, however, becomes more complicated in a multi-core processor that uses a shared program memory. One factor contributing to this difficulty is that it may be necessary to debug the processor cores independent of one another. Whereas the various processor cores in a multi-core processor may be generally identical to one another, the external devices and hardware to which the cores are coupled may be entirely different. For example, one core may be coupled to a modem while another core may be coupled to a voice encoder/decoder ("vocoder"). As such, it may be desirable or even necessary to debug the shared software application as it is executed by one core, but not necessarily as it is executed by the others. Accordingly, each core should be capable of being debugged independently of the other cores.

A conventional debug process requires a host controller coupled to the DSP to insert breakpoints into the program code. Breakpoints force the processor core to halt execution and allows the host to investigate the state of the processor and gather information such as the contents of registers and memory internal to the processor to diagnose a problem. In a multi-core processor in which all cores execute the same program in a common shared memory, it is possible, or perhaps even likely, that a core that is not being debugged will encounter a breakpoint and therefore undesirably stop program execution. It is preferable, therefore, that cores that are not being debugged execute the program code, which includes breakpoints intended for other cores, as if the breakpoints do not exist or with minimal intrusion or delay upon encountering such a breakpoint.

A related problem is when multiple processor cores are being debugged simultaneously. In this instance, the host will insert multiple sets of breakpoints for the various cores being debugged. As such, it is preferable that breakpoints set for one core do not interfere with other cores as noted above. Further, it is preferable for effective debugging, that the host keeps track of which breakpoints are associated with which cores.

It is therefore desirable to provide an improved technique for managing breakpoints in a multi-core processor. Such a technique should be able to maintain instruction consistency among shared resources so as not to corrupt program execution. That is, it is desirable for all processor cores to execute the shared program in its original form even though the program includes breakpoints that are used to debug other cores. Despite the advantages such a system would provide, to date no such system is known to exist.

BRIEF SUMMARY OF THE INVENTION

The aforementioned problems are solved by a processing system that, in accordance with the preferred embodiment includes a digital signal processor (DSP) device and a host system on which the DSP device is implemented or to which the DSP otherwise connects. The DSP device includes a shared program memory and a plurality of processor subsystems coupled to the shared program memory to concurrently execute program instructions stored in the shared program memory. The host system is capable of performing debugging operations on each subsystem. Debugging of a particular DSP subsystem is implemented by placing one or more breakpoints in the program in shared memory. The host associates breakpoints with the subsystem they are intended to halt for debug purposes. Thus, during debugging, the host device inserts debug breakpoints into the shared program memory and tracks the debug breakpoints to determine which subsystems are associated with the breakpoints. Debugging is preferably implemented using a JTAG test port included in the DSP.

The debug breakpoints are inserted into shared program memory into addresses occupied by existing program instructions. To maintain the integrity of the program, any instruction overwritten by a breakpoint preferably is copied to memory in the host device. Such instructions are stored by the host in a memory table. Each entry in the table includes an instruction from program memory, its address, and a designation field indicating the subsystems with which the breakpoint is associated.

When a subsystem executes a breakpoint, the subsystem halts. The host periodically scans the processor to determine the operating states of the various subsystems. If the host determines that a subsystem has halted due to encountering a breakpoint, the host determines the address of the breakpoint that caused that particular processor subsystem to halt. Using the information in the memory table, the host determines whether the halted subsystem is associated with the breakpoint that caused the subsystem to halt. If it is, then the host gathers necessary debug information from that subsystem.

If, however, the processor subsystem is not associated with the breakpoint that caused the subsystem to halt, the host replaces the breakpoint with the original program instruction. The host then triggers the subsystem to execute the newly replaced instruction and halt again, after which the host again replaces the program instruction with the breakpoint and places the subsystem in a normal executing mode from thereon. By temporarily placing the program instruction back into the shared program memory, the halted subsystem is able to execute the complete program. By placing the breakpoint back into the program memory after the subsystem continues normal execution, the breakpoint remains in the shared program memory to permit the DSP to be debugged as was initially intended.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms "processor" and "DSP" are intended to be used interchangeably unless otherwise stated.

DETAILED DESCRIPTION OF THE PREFERRED EMBODIMENTS

The preferred embodiment of the present invention is discussed below in the context of a multi-core, fixed-point, digital signal processor (DSP). This embodiment, however, is not intended to limit the scope of this disclosure to this context, rather, the preferred embodiment has applicability to any multi-core processor device that would benefit from the debug breakpoint management scheme disclosed herein.

Figure 1:
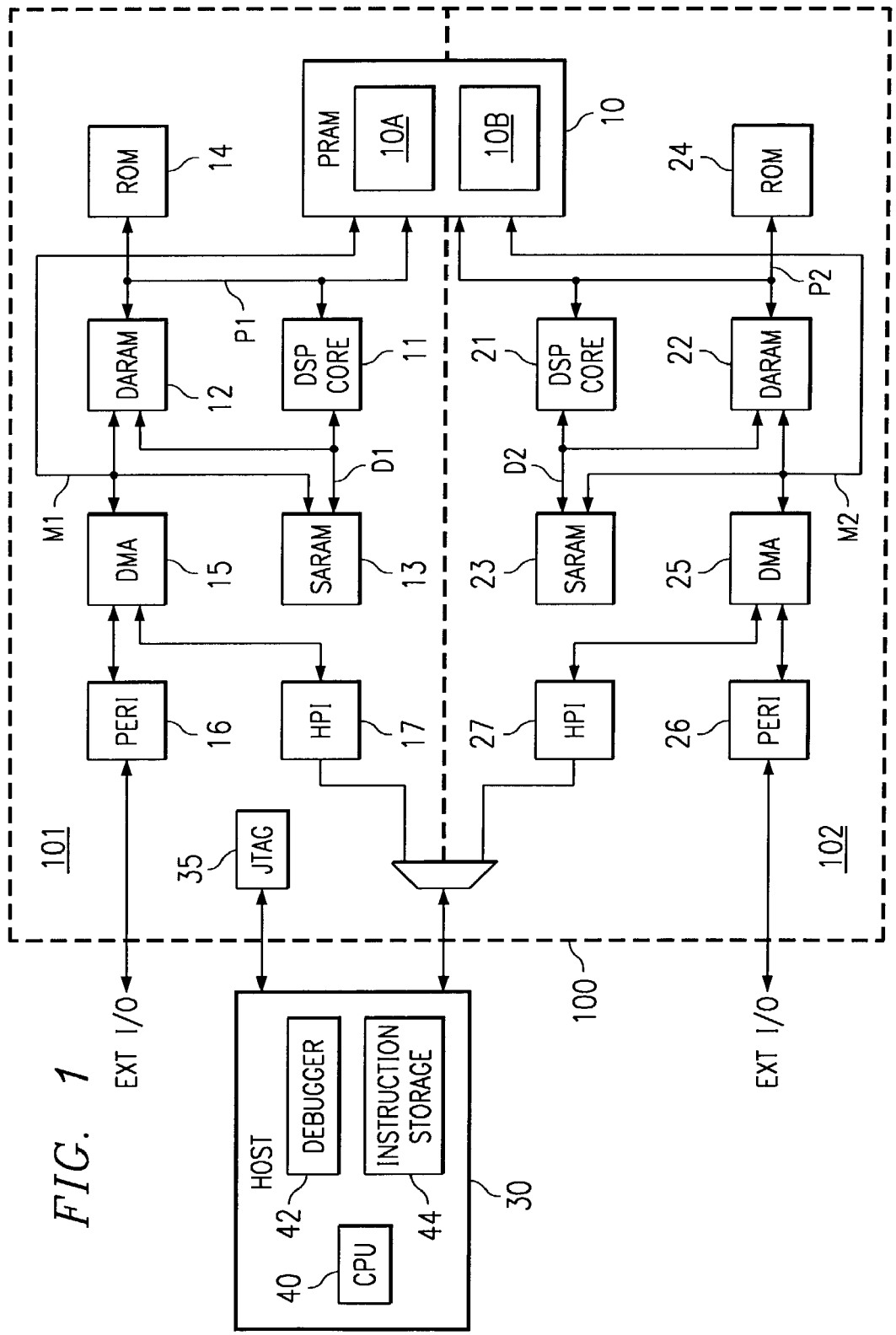
FIG. 1 shows a DSP device having a shared program memory.

Turning now to the figures, FIG. 1 shows a preferred embodiment which includes a DSP 100 coupled to an external host 30. The DSP 100 generally includes multiple DSP subsystems 101, 102 (generally separated by the dashed line) and a shared program random access memory (PRAM) 10. Each DSP subsystem 101, 102 preferably includes a DSP core 11, 21, a dual-access, random access memory (DARAM) 12, 22 for data or software, a single-access, random access memory (SARAM) 13, 23 for data, a read-only memory (ROM) 14, 24 for boot-up, direct memory access (DMA) logic 15, 25 (also referred to as a DMA controller) one or more external peripheral interfaces 16, 26, a host port interface (HPI) 17, 27, a JTAG test port 35, and other miscellaneous support circuitry as desired. The DARAM 12, 22 preferably includes four memory blocks, each of which support two memory accesses per clock cycle. The DARAM 12, 22 is intended primarily for data storage, but may be used to store program instructions as well. A register (not shown) in the DSP core 11, 21 determines whether the DARAM 12, 22 is mapped into program memory space or data memory space. The SARAM 13, 23, preferably also includes four memory blocks, each of which support one memory access per clock cycle. Each SARAM preferably is reserved for data storage.

The shared PRAM 10 preferably is reserved for program instructions, and includes 16 blocks of dual-access RAM. Each block comprises 16 kilobytes of storage, although the block size as well as the number of blocks can be varied as desired. The PRAM 10 may be implemented as two portions 10A and 10B, with each subsystem 101, 102 containing a portion. Each portion 10A, 10B is physically located at the boundary between subsystems 101, 102 to minimize access times. Since the PRAM 10 is shared, each DSP subsystem 101, 102 is preferably capable of fetching and executing an instruction from any location in the PRAM 10 during each clock cycle. According to the preferred embodiment, however, the DSP cores 11, 21 are not permitted to write to the PRAM 10. Thus, cores 11, 21 do not write software to PRAM 10. Instead, preferably the DMA logic 15, 25 writes software instructions to the PRAM 10. DMA controller 15 preferably has write access to PRAM portion 10A and DMA controller 25 has write access to PRAM portion 10B. The software instruction may be provided by host 30 via HPI 17, 27 to the DMA logic 15, 25 for subsequent storage in PRAM 10.

Referring still to FIG. 1, instruction buses P1, P2 couple together the DSP core 11, 21, the local DARAM 12, 22, the local ROM 14, 24, and the shared PRAM 10. Each DSP core 11, 21 preferably has an associated data bus D1, D2 that facilitates data transfers between the local DSP core 11, 21 and its associated data storage devices DARAM 12, 22 and SARAM 13, 23. Each DSP core 11, 21 preferably retrieves instructions via its associated instruction bus P1, P2 from the PRAM 10. The processor cores 11, 21 concurrently fetch and execute distinct instructions from a single program stored in the PRAM 10, and the order in which program instructions are executed by a processor core depends on the data on which the processor core operates. For example, the data on which the cores operate may represent telephone communications, or audio/video output devices. Each core could be responsible for a different set of channels, and as those channels independently initiate and terminate communications, the processors will independently execute the appropriate software instructions. The data determines the order in which instructions are executed.

Each DMA logic 15, 25 moves data and instructions to and from local data storage devices and to shared PRAM 10 via associated memory buses M1, M2. Each DMA logic 15, 25 also couples to various external peripheral interfaces 16, 26, and to HPI 17, 27. External interface ports 16, 26 preferably each include one or more multi-channel serial interfaces. The multi-channel serial ports provide high-speed, full-duplex, double-buffered serial communications for direct interfacing with various peripheral devices. The configuration of these ports is preferably programmable by processor cores 11, 21 to allow direct interfacing with existing standard protocols. The external peripheral interfaces 16, 26 can be coupled to hardware that access the DSP 100 for processing data. For example, a cellular telephone might access the DSP 100 to process incoming or outgoing audio signals via the external peripheral interfaces 16, 26.

The HPI 17, 27, allows the external host 30 to access most or all of the DSPs internal memory via DMA logic 15, 25. Also, as described below, the HPI 17, 27 permits a host 30 to debug the DSP 100 in a way that solves the problems noted above, although this is not the preferred embodiment. Debugging is preferably implemented using a JTAG test port 35 included in the DSP. The HPI 17, 27 may be designed to mimic a memory interface. That is, the host 30 can "view" the contents of any memory location internal to the DSP 100 and many of the DSP core registers by sending an address to the HPI 17, 27 indicating the desired location. One of the HPIs 17, 27, causes the associated DMA logic 15, 25 to retrieve the desired information, and then provides the information as data in the same way that a memory device would. The HPI 17, 27 preferably acts as a slave device to the host 30, but may generate a signal to stall the host 30 during an access if the DMA logic 15, 25 is busy with other tasks.

The DMA controllers 15, 25 perform data transfers independent of the DSP cores 11, 21. The DMA controllers control access to internal memory (PRAM 10, DARAM 12, 22, and SARAM 13, 23) and to external I/O and memory (via external interfaces 16, 26). The DMA controllers 15, 25 can perform background movement of data between internal memory, external memory, and internal peripherals such as the serial ports 16, 26 and HPIs 17, 27. Thus, any breakpoints that are inserted by host 30 into the program code in the PRAM 10 may be inserted via the HPIs 17, 27 and the DMA controllers 15, 25 although the preferred method is via the JTAG test port as described below. In addition to external communications, the DMA controllers 15, 25 also preferably permit core-to-core communications.

Referring still to FIG. 1, the external host 30 communicates with and controls the DSP 100 by providing power and appropriate clock signals (not specifically shown). The host system 30 may be a desktop computer or any consumer device in which DSP 100 generates, such as a cellular telephone or modem. The host system 30 preferably includes a host CPU 40 and at least one memory device capable of storing debugger software 42 and an instruction storage table 44 (discussed in further detail below). For example, debug software 42 may be stored in nonvolatile memory device such as a hard drive and instruction storage table 44 may be stored in volatile random access memory. The debugger software 42 preferably communicates with the DSP 100 via a Joint Test Access Group (JTAG) test port 35 which provides access to data within DSP 100.

Figure 2:
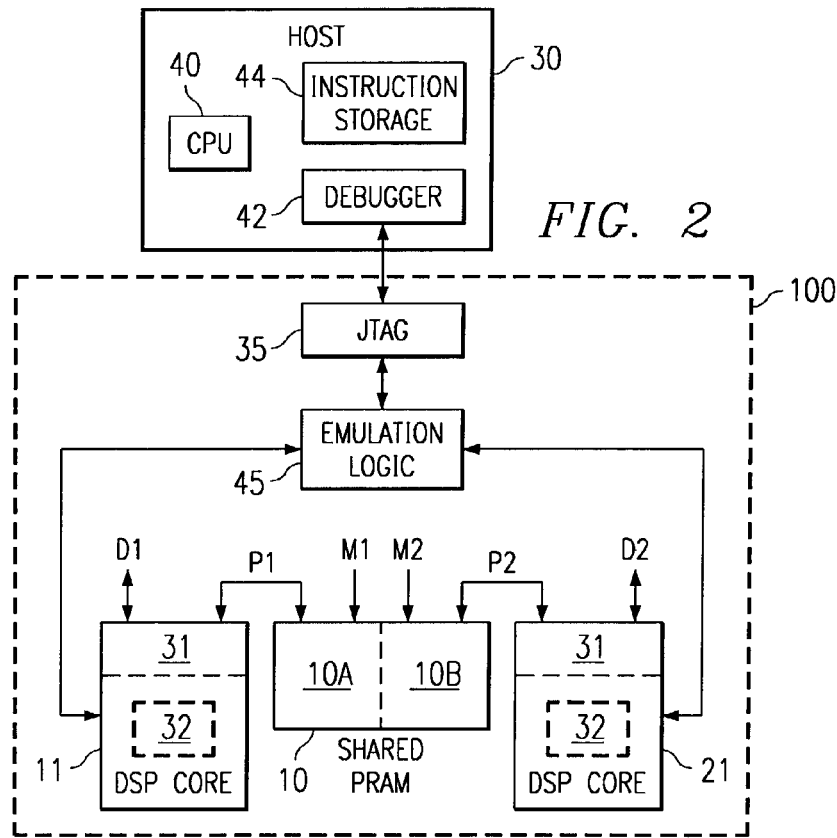
FIG. 2 shows a preferred method for coupling multiple processor cores to the shared program memory and to the emulation logic.

Referring now to FIG. 2, the host 30 and a portion of DSP 100 is shown to emphasize how host 30 interacts with DSP 100 to perform debug operations. The portion of DSP 100 shown includes JTAG test port 35, emulation logic 45 (not previously shown in FIG. 1), cores 11, 21 and shared PRAM 10. Functional verification of DSP device 100 and debugging of software executed by the processor cores 11, 21 is facilitated by inclusion of the test port 35 and emulation logic 45. Test port 35 preferably complies with the Joint Test Access Group specification and also preferably includes pins which allow the host 30 to verify the presence of a test connection and to transmit other emulation signals that permit clock tracking for benchmarking and also to aid in multi-processor debugging. The test port 35 preferably provides serial access to multiple scan chains distributed around the boundary of the device and throughout the modules of particular interest in DSP 100. The scan chains capture the information of interest and allow the information to be serially transmitted off-chip to the host 30. Typical information captured in a scan chain include the operational state of each core 11, 21. The scan chains may also be used to change the information of interest by serially receiving new values through the test port 35. For instance, any program instructions (e.g., breakpoints) that are inserted into the program in shared PRAM 10 are preferably transmitted serially through the test port 35.

Various embodiments of emulation logic 45 and its interface with test port 35 are described in U.S. Pat. No. 5,535,331, which is hereby incorporated herein by reference. Emulation logic may be implemented as part of JTAG port logic 35 if desired. As shown, emulation logic 45 couples to the processor cores 11, 21 the execution of software by the cores 11, 21, program instructions and operand values, which program branches are taken, and register values. The emulation logic 45 periodically scans the processor cores 11, 21 to check the operating state of the cores and provides this scan information to the host CPU 40 via JTAG test port 35.

In a preferred embodiment, processor cores 11, 21 include a bus interface module 31 and other modules not specifically shown in FIG. 2. For instance, the processor cores 11, 21 may incorporate a pipelined architecture comprising, among other items, an instruction fetch module, an instruction decoder module, an execution module, and a memory transfer module. The bus interface module 31 performs instruction and data transfers to and from the memory devices 10, 12, 22, 13, 23, 14, 24 via instruction buses P1, P2 and data buses D1, D2. The processor cores 11, 21 also comprise a state setting 32 that is controlled by the emulation logic 45. The state setting 32 determines the operating state for a particular core. Operating states may include halt, debug, normal and single step modes, or other modes as desired. Emulation logic 45 may change the state settings 32 of a core to a halt mode to cause that core to stop executing instructions while debug information is being retrieved by emulation logic 45 and transmitted to host 30. The normal mode refers to the normal execution of instructions in a program by a core. Any of a variety of states are possible and the state settings are not limited to the modes mentioned above.

The host system 30 can debug processor subsystems 101, 102 individually or together by halting execution by the core associated with the subsystem to be debugged so that information, which may be useful in the debugging operation, can be scanned into and out of the subsystem via the JTAG port 35. The scanned information preferably includes the state setting value for each core (normal, halt, etc.). If a core has been halted due to a breakpoint, the scan chain also includes the address of the breakpoint instruction that caused that core to halt. This information is transferred serially through the JTAG port 35 in accordance with the IEEE 1149.1 JTAG specifications. The debugger software 42 preferably provides a user interface that allows a person to analyze operation of a subsystem by inserting breakpoint instructions into the program in PRAM 10 and specifying which subsystem 101, 102 the breakpoints are intended to permit debugging. The breakpoint instruction causes a core 11, 21 to halt execution. Breakpoints are used to halt a core long enough to permit debugger software 42 to examine the contents of memory and registers at certain points in the program. Any other types of instructions to the debugging process can be used to in place of a breakpoint if desired. Host system 30 may include a display (not shown) to provide a user interface for the debug operation.

The following explanation describes actions performed by the host 30 to independently debug each core 11, 21 in the context of what the debugger software 42 does during debug. It should be recognized, however, that the debugger software 42 (or simply "debugger 42") is executed by the host's CPU 40 and thus it could just as well be stated that CPU 40 performs the functions described below.

Each program instruction in PRAM 10 is assigned a unique address. In accordance with the preferred embodiment, the debugger 42 can insert a breakpoint at a particular point in the program by overwriting the existing instruction in the DSP's program at that point. The debugger 42 may write breakpoint instructions to the desired addresses in PRAM 10 via the HPI 17, 27, DMA controller 15, 25, and memory buses M1, M2 as discussed above. Preferably, the debugger 42 transmits breakpoint information and target address information serially via the JTAG port 35. The debugger 42 also preferably preserves the program instruction overwritten by the breakpoint. For example, the debugger 42 may copy the instruction to be overwritten into the host instruction table 44 as shown in FIG. 3 before writing the breakpoints to PRAM 10.

Figure 3:
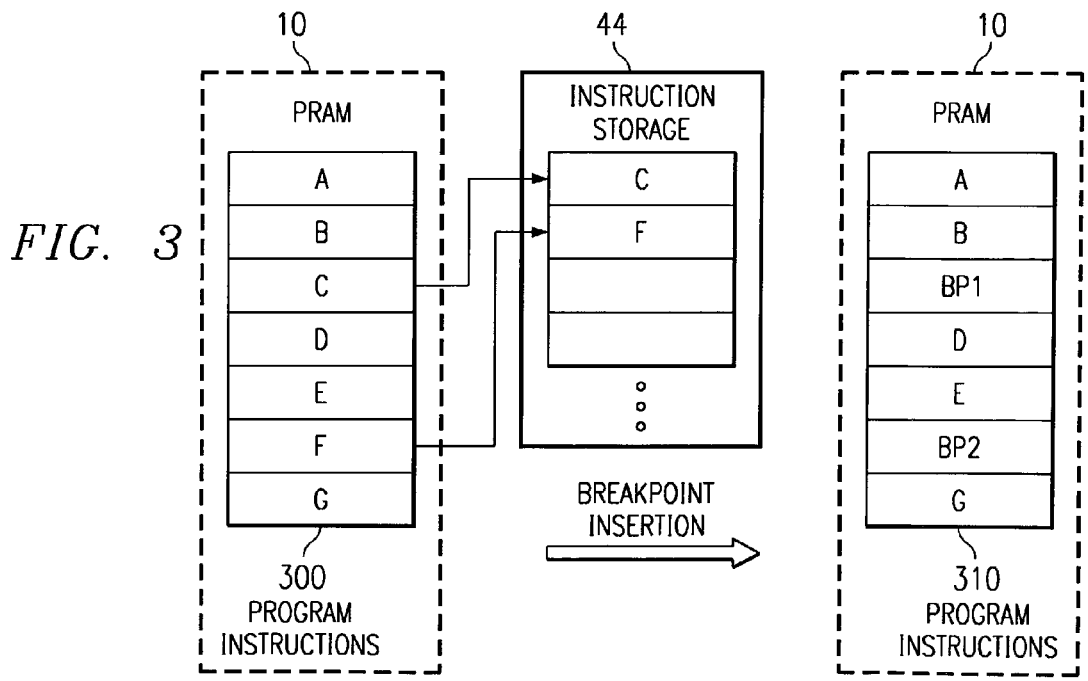
FIG. 3 shows the process by which debug breakpoints are inserted in shared program memory.

FIG. 3 shows a representative group of program instructions 300 as stored in shared PRAM 10. Seven instructions labeled A–G are shown in PRAM 10 on the left side of FIG. 3. As an example, it is assumed that the host debugger 42 determines that breakpoints must be inserted (written) into the locations occupied by instructions C and F. The debugger 42 may insert breakpoints after a predetermined number of instructions from a designated point in the program or a user may designate specific locations in the program to insert a breakpoint. Prior to breakpoint insertion, the debugger 42 requests the contents of instructions C and F from the JTAG controller 35 and stores the retrieved instructions in instruction storage table 44 located in host 30. The host 30 preferably has a memory map of the PRAM 10 and is therefore capable of directing the JTAG controller 35 to retrieve the required instruction. Additional description of the instruction storage table 44 is provided in conjunction with the description of FIG. 4 below. Once the appropriate program instructions are extracted and stored in table 44, the debugger 42 directs the JTAG controller 35 to overwrite the instructions in PRAM 10 with breakpoint instructions. In instruction group 310, these breakpoints are denoted BP1 and BP2. During program execution, when a processor core 11, 21 encounters either one of these breakpoints, that core will halt execution and wait for further instruction from the debugger 42.

Figures 4, 5:
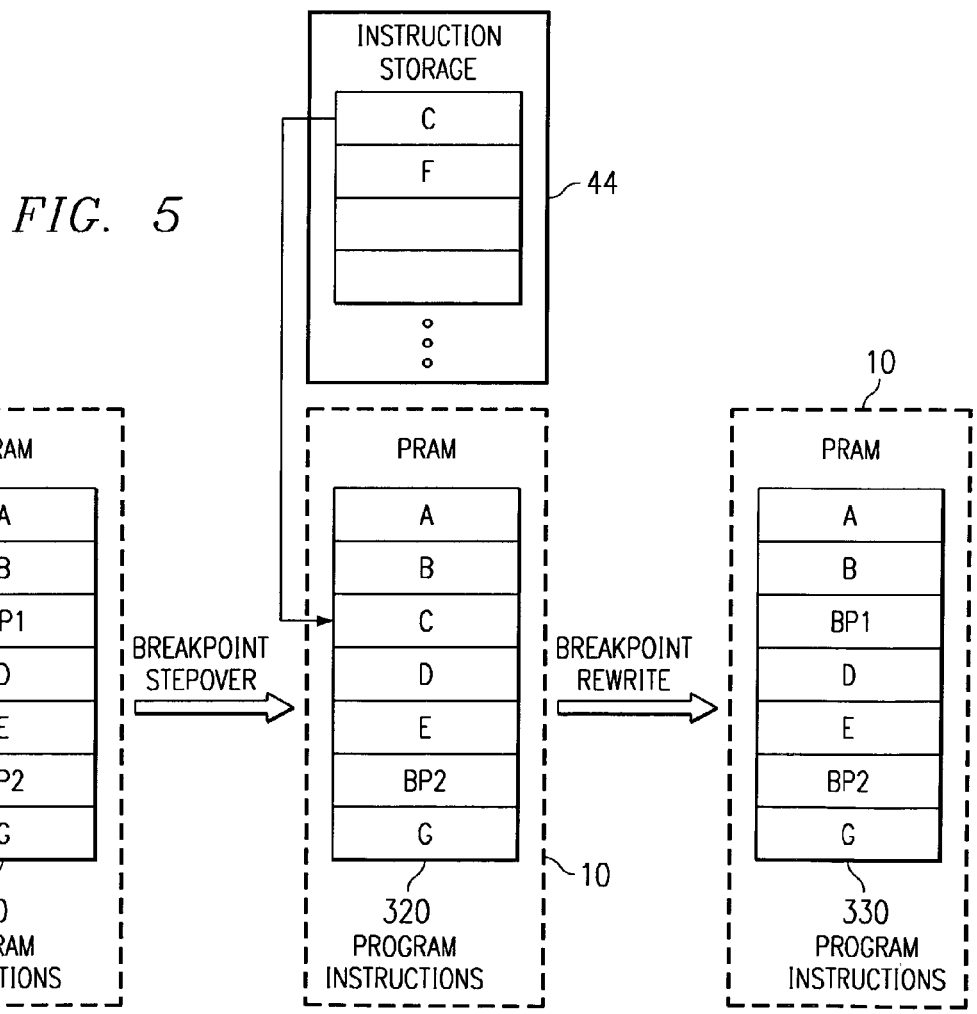
FIG. 4 shows a preferred embodiment of a table configured to store program instructions overwritten by debug breakpoints.
FIG. 5 shows the breakpoint stepover process for a breakpoint not attributable to a core.

Referring now to FIG. 4, a preferred structure of the instruction storage table 44 is shown. The instruction storage table 44 preferably comprises 1024 entries (permitting 1024 breakpoints), although that number can be varied, and includes at least three fields: the original instruction address 410 in PRAM 10, the instruction 420 itself (which may include an op code, operands, etc.), and a multi-bit designation flag 430. The address 410 preferably is the address occupied by the program instruction in PRAM 10 before it is replaced by a breakpoint. The designation flag field 430 identifies the core with which any given breakpoint is associated. In the case of a 2-core DSP 100 such as that shown in FIG. 1, the flag field 430 may comprise two bits, with each bit representing one of the two cores. In a preferred embodiment, an asserted bit indicates that the breakpoint inserted in place of the original instruction is associated with the core represented by that bit. A "global" breakpoint that is intended for both cores would be represented by a designation flag 430 that has both bits asserted. It should be noted that the polarity of the flag bits is irrelevant and that the size of the flag field can be increased to account for more than two cores. The flag 430 may also be implemented using any other appropriate designation technique that attributes breakpoints to specific processor cores.

Since original program instructions are replaced in the program code with breakpoints and since most or all cores in the preferred embodiment execute the common program code, all cores executing the shared program will likely encounter the breakpoints. All cores, including cores not associated with the breakpoint, will therefore halt execution upon encountering a breakpoint. Upon encountering a breakpoint and halting, the emulation logic 45 sets the state setting 32 in the halted core to indicate that the core is in the halted state. As noted above, host 40 periodically scans the behavior of DSP 100 by reading a scan chain of status information through the JTAG port 35. Preferably, the scan chain includes an identification of each core 11, 21 and the operational state for each core. If a core has been halted due to encountering a breakpoint, the scan chain information also includes the address of the breakpoint that caused the core to halt. By reading the scan chain, host 40 will be able to determine which, if any, cores have halted and which breakpoints caused such a core to halt. As will be explained in detail with regard to FIG. 5, the host 40 determines if a core has halted and, if so, the address of the breakpoint that caused that core to halt. Comparing this information to the entries in the instruction storage table 44 permits the host 30 to determine whether the halted core is intended to be debugged using that breakpoint. If the halted core is to be debugged, then the host 40 can examine registers, memory locations, etc. to perform whatever debug operations are desired. If the halted core is not intended to be debugged, or at least not debugged using the breakpoint that caused the core to halt, the host 40 performs an action (explained below) to cause the halted core to execute the instruction that was replaced by the breakpoint and continue in a normal operating mode thereafter.

With this debugging technique, cores that are not being debugged will halt due to breakpoints intended for other cores, but the cessation in executing activity is relatively short. Preferably, the debugger software 42 causes the host 40 to scan the DSP 100 often enough so that halted cores that are not associated with the breakpoint causing the halt are restarted quickly enough to provide satisfactory performance. For example, the hosts 40 may scan the DSP ten times per second to check for halted cores. Of course, the frequency of the scan can be any desired frequency given the overall function performed by the DSP. The preferred technique to cause a core to continue execution that was halted by a breakpoint not intended for that core is illustrated in detail with respect to FIG. 5 as discussed below.

FIG. 5 shows the same group of seven instructions 310 in PRAM 10 that were shown in FIG. 3. As discussed above, original instructions C and F have been replaced by breakpoints BP1 and BP2 and the original contents of instructions C and F are stored in the instruction storage table 44 in host memory. Consider the case where a core for which breakpoints BP1 and BP2 are not intended encounters the first of these two breakpoints (BP1) and halts as is required by the breakpoint. On a subsequent scan of the DSP core's operating states, the debugger 42 determines that the halted core, in fact, has halted. The debugger 42 then compares the address of the breakpoint instruction that caused the core to halt with addresses in the instruction storage table 44. The debugger 42 also compares the identification of the halted core from the scan chain to the destination flags 430 in table 44. As such the debugger 44 can determine whether the halted core is a core which the breakpoint was intended to halt or not. In this way, debugger 44 can determine whether the halted core should remain halted so as to be debugged or resume normal operation. If the core should remain halted, the debugger software can be used to read certain memory locations, registers and the like.

However, if the debugger 42 determines that that halted core should be restarted, the debugger 42 preferably causes the halted core to execute the instruction C that was replaced by the breakpoint (BP1). Because the original instruction C (which was replaced by BP1) is "missing" from PRAM 10, the instruction must be written back to PRAM 10 from the instruction storage table 44. The debugger 42 therefore initiates a "breakpoint stepover" process that involves several steps in accordance with the preferred embodiment. First, the debugger 42 initiates a request to the JTAG 35 to write instruction C back to its original location as shown in instruction group 320. Next, the debugger 42 places the core in a single-step execution mode by altering the state setting 32 in the core. Single-step mode permits the debugger 44 to control execution flow by causing a processor core to execute a single instruction and then stop again. In this mode, the processor core executes a single instruction and awaits a command to execute the next instruction, thereby permitting a user to examine subsystem 101, 102 contents one instruction at a time.

During the breakpoint stepover process, after the original instruction C is copied to PRAM 10 (as illustrated by instruction sequence 320), the core then, in single step mode, executes the newly inserted instruction C and halts after executing this single instruction. After the core executes instruction C and halts, the debugger 42 proceeds to rewrite the breakpoint (BP1) back into the location occupied by instruction C as indicated by instruction group 330. This step is desired to permit other core(s) for which breakpoint BP1 is intended to halt upon encountering BP1. Lastly, the debugger 42 directs the core having just executed newly replaced instruction C to continue normal execution by once again changing the state setting 32 for the core to the normal mode.

During the preferred embodiment of the breakpoint stepover process described above, the original program instructions (C or F in the present example) are copied to PRAM 10 as needed and a copy remains in the instruction storage table 44. Preferably, the instructions remain in the storage table 44 until the breakpoints are permanently removed from PRAM 10, such as when it is no longer desired to debug a core. Furthermore, the breakpoint stepover process described above preferably is implemented by the debugger code 42. It is envisioned that this stepover process also may be implemented using a state machine or a variety of status bits or registers. In short, any embodiment that permits a breakpoint to be temporarily replaced by a program instruction is acceptable.

The preferred embodiment heretofore discussed provides an efficient mechanism for setting and managing breakpoints for debugging a multi-core DSP that uses a shared program memory. The preferred embodiment advantageously permits independent debugging of the processor cores with minimal delays while preserving consistency of the shared instructions. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A host system used to debug a multi-core processor including a shared program memory into which program instructions are stored, comprising:
   a CPU;
   volatile memory coupled to said CPU used to store a plurality of instruction entries, each entry comprising an instruction, an address of said instruction, and a flag indicating a core associated with said instruction;
   wherein said host:
      receives status information regarding a core in the multicore processor that has halted execution due to encountering a breakpoint instruction in the shared program memory, the status information includes the address of the breakpoint instruction from the shared program memory;
      compares said address of the breakpoint instruction to addresses stored in said volatile memory associated with the halted core;
      if said address of the breakpoint instruction matches an address stored in said volatile memory associated with the halted core, the host performs a debugging operation on the halted core; and
      if said address of the breakpoint instruction does not match an address stored in said volatile memory associated with the halted core, the host overwrites the breakpoint instruction in the shared program memory with a program instruction from an instruction entry in said volatile memory matching said address of the breakpoint instruction, single steps the halted core to execute said program instruction, overwrites the program instruction with the breakpoint instruction and places the halted core in a normal execution mode to execute following instructions.

2. The host system of claim 1 wherein said status information is received periodically.

3. A method of debugging a multi-core processor coupled to a shared program memory, comprising:
   copying a program instruction from the shared program memory into memory in a host coupled to the multicore processor;

storing a designator identifying a processor core that is associated with a breakpoint instruction into the host's memory;

storing the address of the program instruction into the host's memory;

overwriting the program instruction in the shared program memory with the breakpoint instruction;

receiving status information regarding the cores in the multi-core processor indicating the operational state of each core and, if the core has halted execution due to a breakpoint instruction said status information including the address of the breakpoint instruction;

comparing each breakpoint instruction address to addresses stored in said volatile memory associated with the core that has halted execution;

if said breakpoint instruction address matches an address stored in said volatile memory for the core that has halted execution, performing a debugging operation on the core that has halted execution; and if said breakpoint instruction address does not match an address stored in said volatile memory for the core that has halted execution, overwriting the breakpoint instruction in the shared program memory with a program instruction from an instruction entry in said volatile memory matching the address of the breakpoint instruction, single stepping the core that has halted execution to execute said program instruction, overwriting the program instruction with the breakpoint instruction and placing the core that has halted execution in a normal execution mode to execute following instructions.

4. The method of claim 3 wherein the status information is received periodically.

5. A method of debugging a multi-core processor including a shared program memory, comprising:

(a) receiving status information regarding the cores in the multicore processor indicating the operational state of each core and, if a core has halted execution due to a breakpoint instruction, the status information includes the address of the breakpoint instruction from the shared program memory;

(b) comparing said address of the breakpoint instruction to addresses stored in a host system coupled to said multi core processor;

(c) if said address of the breakpoint instruction matches an address stored in said host system, performing a debugging operation on the core that has halted execution; and (d) if said address of the breakpoint instruction does not match an address stored in said host system, overwriting the breakpoint instruction in the shared program memory with a program instruction from said host system corresponding to the breakpoint instruction address, single stepping the core that has halted execution to execute said program instruction, overwriting the program instruction with the breakpoint instruction and placing the core that has halted execution in a normal execution mode to execute following instructions.

6. The method of claim 5 wherein said status information is received periodically.

* * * * *